United States Patent
Wang et al.

(10) Patent No.: US 8,532,161 B2
(45) Date of Patent: Sep. 10, 2013

(54) METHOD AND APPARATUS THAT FACILITATES ESTIMATING DOPPLER SPREAD FOR UPLINK TRANSMISSIONS

(75) Inventors: Renqiu Wang, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 405 days.

(21) Appl. No.: 12/817,798

(22) Filed: Jun. 17, 2010

(65) Prior Publication Data

US 2011/0142115 A1  Jun. 16, 2011

Related U.S. Application Data

(60) Provisional application No. 61/219,351, filed on Jun. 22, 2009.

(51) Int. Cl.
*H04B 1/00* (2006.01)

(52) U.S. Cl.
USPC ........... 375/147; 375/340; 375/354; 370/252; 370/465; 370/500; 455/67.11; 455/226.1

(58) Field of Classification Search
USPC ................. 375/147, 149, 150, 152, 324, 340, 375/343, 362, 354, 368, 367, 366, 365; 455/67.11, 152.1, 154.1, 158.1, 226.1, 226.4, 455/226.2; 370/252, 464, 465, 491, 500, 370/509, 512, 514, 515
See application file for complete search history.

(56) References Cited

U.S. PATENT DOCUMENTS

| | | | |
|---|---|---|---|
| 6,757,547 B1 | 6/2004 | Goeddel | |
| 7,375,682 B1 * | 5/2008 | Tester et al. | 342/357.63 |
| 8,243,613 B2 * | 8/2012 | Park et al. | 370/252 |
| 2004/0180697 A1 * | 9/2004 | Lee et al. | 455/561 |
| 2005/0237932 A1 * | 10/2005 | Liu | 370/230 |
| 2006/0227887 A1 | 10/2006 | Li et al. | |
| 2007/0242760 A1 | 10/2007 | Hsiung et al. | |
| 2008/0240308 A1 * | 10/2008 | Lee et al. | 375/343 |
| 2009/0075678 A1 * | 3/2009 | Ogoro | 455/456.6 |

FOREIGN PATENT DOCUMENTS

WO  WO2007024027 A1  3/2007

OTHER PUBLICATIONS

International Search Report and Written Opinion—PCT/US2010/039514—ISA/EPO—Jul. 20, 2011.
Partial International Search Report—PCT/US2010/039514—International Search Authority, European Patent Office, Oct. 26, 2010.

(Continued)

*Primary Examiner* — Dac Ha
(74) *Attorney, Agent, or Firm* — Nerrie M. Zohn

(57) ABSTRACT

Methods, apparatuses, and computer program products are disclosed for performing a Doppler spread estimation. In a first embodiment, an energy associated with a communication from a wireless terminal is ascertained based on at least one pilot symbol and at least one data symbol. Each of an energy variance and a noise variance are then determined to facilitate estimating a speed of the wireless terminal based on the energy variance normalized by the noise variance. In another embodiment, a signal received from a wireless terminal is decoded and replicated. A channel estimate associated with a set of data symbols is then ascertained from the replica, which is used to estimate the speed of the wireless terminal.

41 Claims, 11 Drawing Sheets

(56) References Cited

OTHER PUBLICATIONS

Sangho Nam, et al., "Robust velocity estimation for non-isotropic and AWGN channel", Vehicular Technology Conference, 2005. VTC-2005-Fall. 2005 IEEE 62nd Dallas, TX, USA Sep. 25-28, 2005, Piscataway, NJ, USA,IEEE LNKD-DOI: 10.1109/VETECF.2005. 1558459, vol. 3, Sep. 25, 2005, pp. 2003-2006, XP010878825, ISBN: 978-0-7803-9152-9.

Taiwan Search Report—TW099120386—TIPO—Feb. 21,2013.

\* cited by examiner

METHOD AND APPARATUS THAT FACILITATES ESTIMATING DOPPLER SPREAD FOR UPLINK TRANSMISSIONS

CROSS-REFERENCE TO RELATED APPLICATIONS

This application claims the benefit of U.S. Provisional Patent Application Ser. No. 61/219,351 entitled "SYSTEMS AND METHODS OF ESTIMATING DOPPLER SPREAD FOR LTE UPLINK TRANSMISSIONS," which was filed Jun. 22, 2009. The aforementioned application is herein incorporated by reference in its entirety.

BACKGROUND

I. Field

The following description relates generally to wireless communications, and more particularly to methods and apparatuses that facilitate estimating Doppler spread.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

With respect to mobility of a mobile device, it is noted that such mobility typically introduces Doppler shift and Doppler spread to a received signal. For LTE systems, for example, the mobile speed can be supported for up to 350 kilometers/hour, which introduces relatively high Doppler shift/spread as well as temporal variation of the received signal. At the receiver, although conventional systems can partially compensate for Doppler shift by implementing a frequency tracking loop, Doppler spread is typically more difficult to compensate. In addition, fast channel variation has to be taken into account for both scheduler as well as receiver algorithms. For example, in a channel estimation block, one can use the mobile speed information to determine whether channel interpolation or pilot averaging should be used.

In general, it is noted that conventional Doppler estimation is usually based on correlation of pilot symbols, which generally requires more than one pilot symbol per estimate. However, such a requirement is difficult to meet in current the uplink frame structure of LTE systems. For Physical Uplink Shared Channel (PUSCH) with intra-Transmission Time Interval (TTI) frequency hopping, for example, there is only one pilot per slot. Also, for Physical Uplink Control Channel (PUCCH)-Channel Quality Indication (CQI) channel, although two pilot symbols exist for normal cyclic prefix (CP), there is only one pilot symbol in extended CP. Likewise, for PUCCH-Acknowledgment channel, due to time-domain spreading, there is also only one pilot/channel estimate after de-spreading. Accordingly, the current standard does not allow for such a conventional solution.

The above-described deficiencies of current wireless communication systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with estimating Doppler spread. In one aspect, methods and computer program products are disclosed that facilitate performing a Doppler spread estimation. These embodiments include receiving a communication from a wireless terminal that includes at least two symbols. In an aspect, the at least two symbols may, for example, include data symbols, pilot symbols, or any combination of appropriate symbols. These embodiments also include ascertaining an energy associated with the communication, wherein the energy is based on the at least two symbols. Each of an energy variance and a noise variance are then determined to facilitate estimating a speed of the wireless terminal For this particular embodiment, such speed is estimated based on the energy variance normalized by the noise variance.

In another aspect, an apparatus configured to facilitate performing a Doppler spread estimation is disclosed. Within such embodiment, the apparatus includes a processor configured to execute computer executable components stored in memory. The computer executable components include a communication component, an energy component, a variance component, and a speed component. The communication component is configured to receive a communication which includes at least two symbols from a wireless terminal, whereas the energy component is configured to ascertain an energy associated with the communication based on the at least two symbols. In an aspect, the at least two symbols may, for example, include data symbols, pilot symbols, or any combination of appropriate symbols. The variance component is then configured to determine an energy variance and a noise variance, which facilitate estimating a speed of the wireless terminal Specifically, for this embodiment, the speed component is configured to estimate a speed of the wireless terminal based on the energy variance normalized by the noise variance.

In a further aspect, another apparatus is disclosed. Within such embodiment, the apparatus includes means for receiving, means for ascertaining, means for determining, and means for estimating. For this embodiment, the means for receiving is a means for receiving a communication which includes at least two symbols from a wireless terminal In an aspect, the at least two symbols may, for example, include data symbols, pilot symbols, or any combination of appropriate symbols. The means for ascertaining is then configured to ascertain an energy associated with the communication based on the two symbols, whereas the means for determining is configured to determine an energy variance and a noise variance. For this embodiment, the means for estimating then estimates a speed of the wireless terminal based on the energy variance normalized by the noise variance.

In another aspect, other methods and computer program products are disclosed for performing a Doppler spread estimation. These embodiments include receiving a signal from a wireless terminal, which includes a set of pilot symbols and/ or a set of data symbols. These embodiments further include decoding the signal, and generating a replica of the signal. A channel estimate associated with the set of data symbols is then ascertained from the replica, which facilitates estimating a speed of the wireless terminal Namely, for this particular embodiment, the speed of the wireless terminal is estimated based on the channel estimate from pilot symbols as well from regenerated data symbols.

Another apparatus for performing a Doppler spread estimation is also disclosed. Within such embodiment, the apparatus includes a processor configured to execute computer executable components stored in memory. The computer executable components include a communication component, a decoding component, a generation component, an estimation component, and a speed component. The communication component is configured to receive a signal from a wireless terminal which includes a set of pilot symbols and a set of data symbols. The decoding component is then configured to decode the signal, whereas the generation component is configured to generate a replica of the signal. Furthermore, the estimation component is configured to ascertain a channel estimate associated with the set of data symbols from the replica. The speed component is then configured to estimate a speed of the wireless terminal based on the channel estimate from pilot symbols as well from regenerated data symbols.

In a further aspect, another apparatus is disclosed. Within such embodiment, the apparatus includes means for receiving, means for decoding, means for generating, means for ascertaining, and means for estimating. For this embodiment, the means for receiving receives a signal from a wireless terminal which includes a set of pilot symbols and a set of data symbols. The means for decoding then decodes the signal, whereas the means for generating generates a replica of the signal. For this embodiment, the means for ascertaining is configured to ascertain a channel estimate associated with the set of data symbols from the replica. The means for estimating then estimates a speed of the wireless terminal based on the channel estimate from pilot symbols as well from regenerated data symbols.

To the accomplishment of the foregoing and related ends, the one or more embodiments comprise the features hereinafter fully described and particularly pointed out in the claims The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
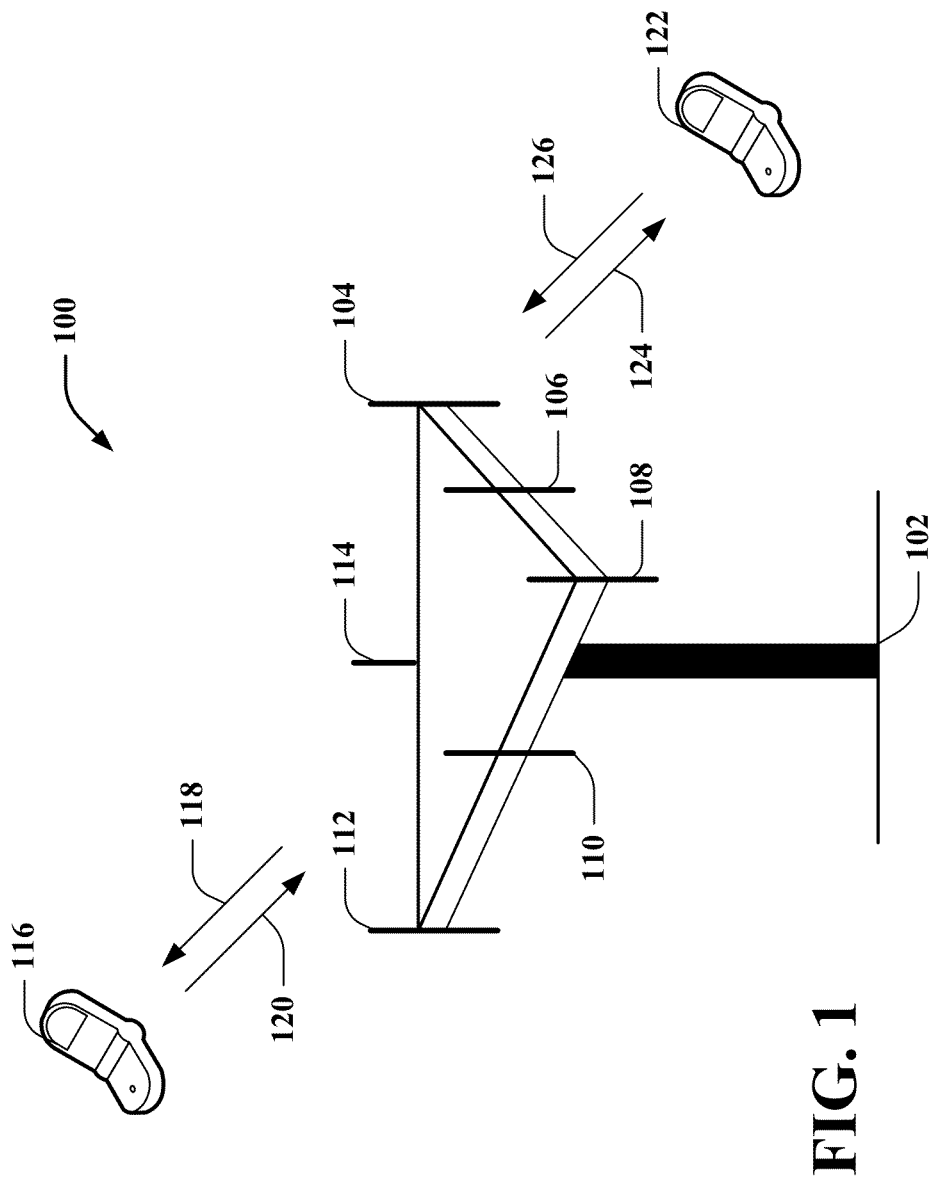
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

The subject specification is directed towards performing a Doppler spread estimation. In a particular embodiment, the subject innovation estimates a speed of a mobile unit via Doppler effects that are based on a quadrature-phase-shift-keying (QPSK) modulation in uplink Channel Quality Indication (CQI) on Physical Uplink Control Channel (PUCCH).

In one aspect, by minimizing the noise effect at the low operating signal-to-noise ratio (SNR) of CQI channels, the accuracy of non-coherent Doppler spreads for a mobile unit is increased. By modeling the received signal with the channel and noise variations and proper selection of the output metrics, the subject innovation can separate different user speeds, and provide a good estimate of the speed ranges for a mobile unit.

In a related methodology, by exploiting the constant modulo properties of the LTE uplink channel, the speed of a mobile unit can be estimated. Initially, energy of received symbols for channel energy and noise can be estimated. Subsequently, the noise effect at the low operating SNR of CQI channels can be minimized. Next, the received signal can be modeled with channel and noise variations, and a substantially accurate estimate for velocity of mobiles can be provided.

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA), High Speed Packet Access (HSPA), and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

High speed packet access (HSPA) can include high speed downlink packet access (HSDPA) technology and high speed uplink packet access (HSUPA) or enhanced uplink (EUL) technology and can also include HSPA+ technology. HSDPA, HSUPA and HSPA+ are part of the Third Generation Partnership Project (3GPP) specifications Release 5, Release 6, and Release 7, respectively.

High speed downlink packet access (HSDPA) optimizes data transmission from the network to the user equipment (UE). As used herein, transmission from the network to the user equipment UE can be referred to as the "downlink" (DL). Transmission methods can allow data rates of several Mbits/s. High speed downlink packet access (HSDPA) can increase the capacity of mobile radio networks. High speed uplink packet access (HSUPA) can optimize data transmission from the terminal to the network. As used herein, transmissions from the terminal to the network can be referred to as the "uplink" (UL). Uplink data transmission methods can allow data rates of several Mbit/s. HSPA+ provides even further improvements both in the uplink and downlink as specified in Release 7 of the 3GPP specification. High speed packet access (HSPA) methods typically allow for faster interactions between the downlink and the uplink in data services transmitting large volumes of data, for instance Voice over IP (VoIP), videoconferencing and mobile office applications Fast data transmission protocols such as hybrid automatic repeat request, (HARQ) can be used on the uplink and downlink. Such protocols, such as hybrid automatic repeat request (HARQ), allow a recipient to automatically request retransmission of a packet that might have been received in error.

Various embodiments are described herein in connection with an access terminal An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB), access point base station, or some other terminology.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

Figure 2:
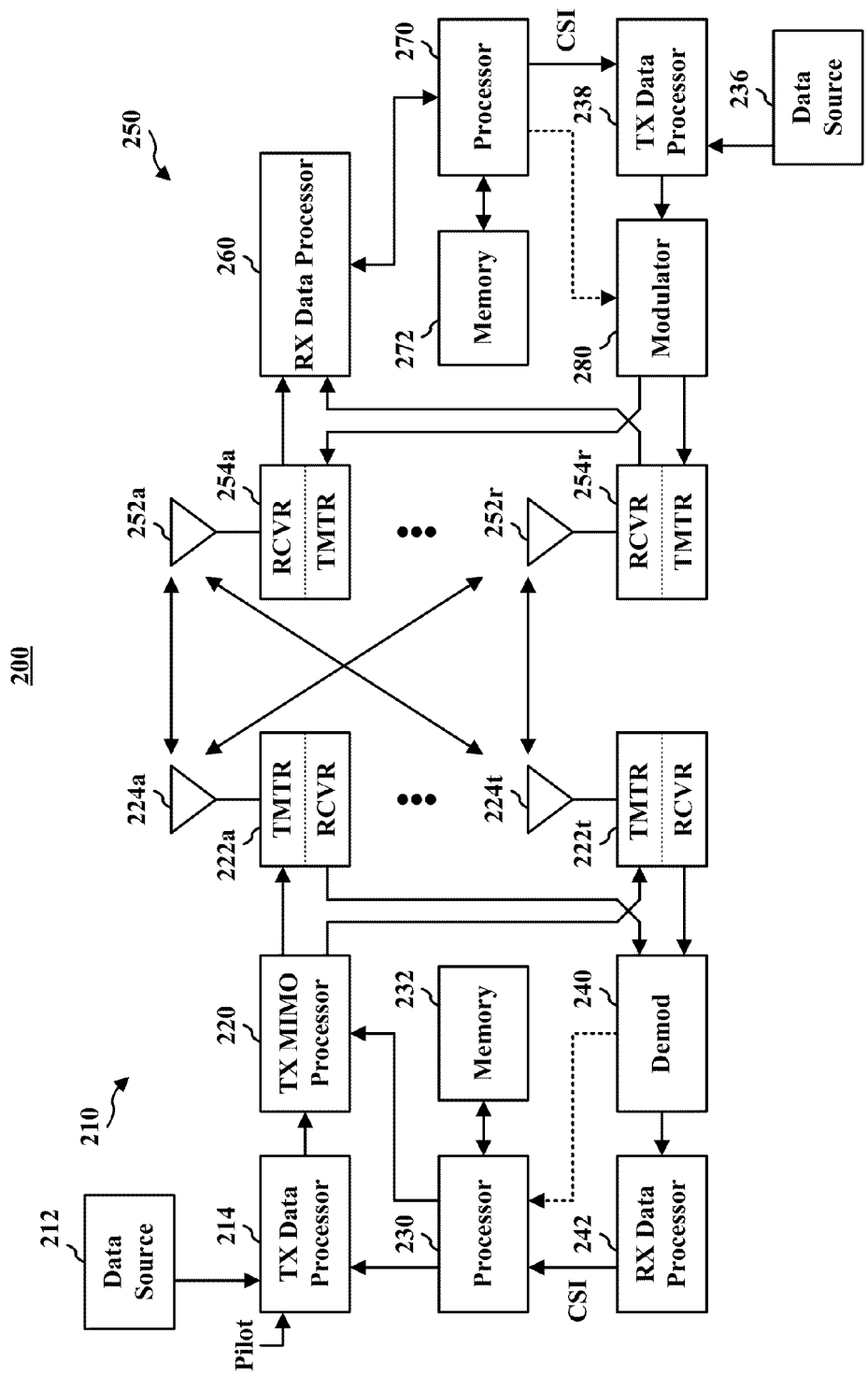
FIG. 2 is an illustration of an exemplary wireless network environment that can be employed in conjunction with the various systems and methods described herein.

FIG. 2 shows an example wireless communication system 200. The wireless communication system 200 depicts one base station 210 and one access terminal 250 for sake of brevity. However, it is to be appreciated that system 200 can include more than one base station and/or more than one access terminal, wherein additional base stations and/or access terminals can be substantially similar or different from example base station 210 and access terminal 250 described below. In addition, it is to be appreciated that base station 210 and/or access terminal 250 can employ the systems and/or methods described herein to facilitate wireless communication there between.

At base station 210, traffic data for a number of data streams is provided from a data source 212 to a transmit (TX) data processor 214. According to an example, each data stream can be transmitted over a respective antenna. TX data processor 214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 250 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 230.

The modulation symbols for the data streams can be provided to a TX MIMO processor 220, which can further process the modulation symbols (e.g., for OFDM). TX MIMO processor 220 then provides $N_T$ modulation symbol streams to $N_T$ transmitters (TMTR) 222a through 222t. In various embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 222a through 222t are transmitted from $N_T$ antennas 224a through 224t, respectively.

At access terminal 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective signal, digitizes the conditioned signal to provide samples, and further processes the samples to provide a corresponding "received" symbol stream.

An RX data processor 260 can receive and process the $N_R$ received symbol streams from $N_R$ receivers 254 based on a particular receiver processing technique to provide $N_T$ "detected" symbol streams. RX data processor 260 can demodulate, deinterleave, and decode each detected symbol stream to recover the traffic data for the data stream. The processing by RX data processor 260 is complementary to that performed by TX MIMO processor 220 and TX data processor 214 at base station 210.

A processor 270 can periodically determine which available technology to utilize as discussed above. Further, processor 270 can formulate a reverse link message comprising a matrix index portion and a rank value portion.

The reverse link message can comprise various types of information regarding the communication link and/or the received data stream. The reverse link message can be processed by a TX data processor 238, which also receives traffic data for a number of data streams from a data source 236, modulated by a modulator 280, conditioned by transmitters 254a through 254r, and transmitted back to base station 210.

At base station 210, the modulated signals from access terminal 250 are received by antennas 224, conditioned by receivers 222, demodulated by a demodulator 240, and processed by a RX data processor 242 to extract the reverse link message transmitted by access terminal 250. Further, processor 230 can process the extracted message to determine which precoding matrix to use for determining the beamforming weights.

Processors 230 and 270 can direct (e.g., control, coordinate, manage, etc.) operation at base station 210 and access terminal 250, respectively. Respective processors 230 and 270 can be associated with memory 232 and 272 that store program codes and data. Processors 230 and 270 can also perform computations to derive frequency and impulse response estimates for the uplink and downlink, respectively.

Figure 3:
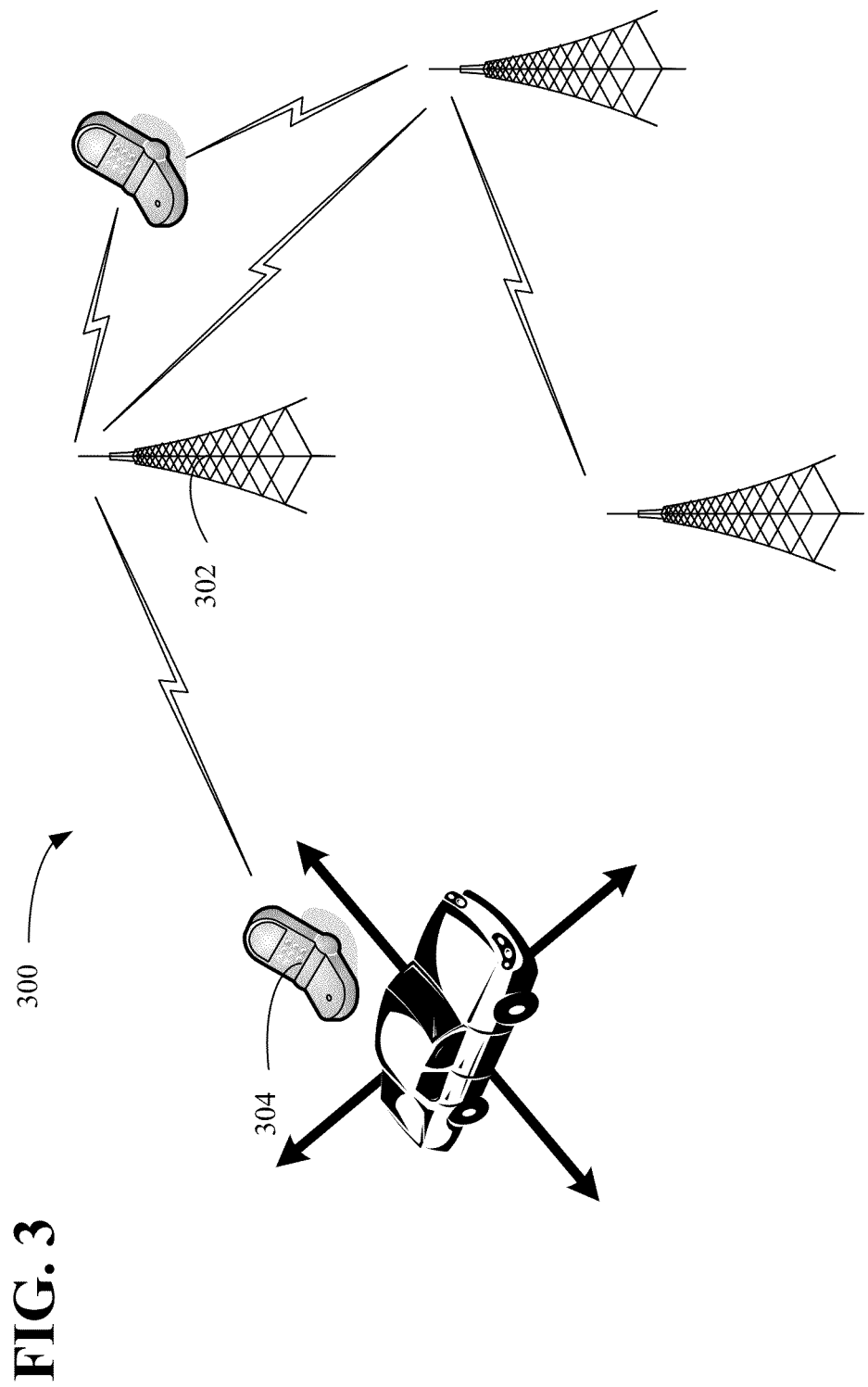
FIG. 3 is an illustration of an exemplary system for performing a Doppler spread estimation according to an embodiment.

Referring next to FIG. 3, an exemplary system that facilitates performing Doppler spread estimations according to an embodiment is provided. As illustrated, system 300 can comprise one or more base stations 302 in one or more sectors that receive, transmit, repeat, and so forth, wireless communication signals to each other and/or to one or more mobile devices 304. As stated previously, each base station 302 can comprise multiple transmitter chains and receiver chains (e.g., one for each transmit and receive antenna), each of which can in turn comprise a plurality of components associated with signal transmission and reception (e.g., processors, modulators, multiplexers, demodulators, demultiplexers, antennas, and so forth). Each mobile device 304 can comprise one or more transmitter chains and receiver chains, which can be utilized for a MIMO system. Moreover, each transmitter and receiver chain can comprise a plurality of components associated with signal transmission and reception (e.g., processors, modulators, multiplexers, demodulators, demultiplexers, antennas, and so forth), as will be appreciated by one skilled in the art.

In an aspect, system 300 estimates speed of a mobile device 304 via Doppler estimation based on QPSK modulation in uplink CQI on PUCCH. By minimizing the noise effect at the low operating SNR of CQI channels, accuracy of non-coherent Doppler spreads for a mobile unit is increased. In addition, by modeling the received signal with the channel and noise variations and proper selection of the output metrics, the subject innovation can separate different user speeds, and provide a desirable speed range estimate for the mobile device 304.

In a particular embodiment, the subject innovation implements a non-coherent algorithm to estimate mobile speed at the eNodeB side. Within such embodiment, rather than obtaining an exact value of the mobile speed, a rough estimation for the mobile speed can be provided. Moreover, a rough estimation can be provided since the subject innovation contemplates supplying high level decisions, such as how many users to multiplex in time domain spreading and/or whether to use interpolation for channel estimation. Here, it should be noted that the subject innovation contemplates a general fading channel rather a strong Rician channel, for example. Accordingly, the subject innovation can rely on a frequency tracking loop to correct phase rotations.

In a further aspect, estimations are performed by exploiting the fact that QPSK modulation is used in uplink CQI on PUCCH channel which has constant modulus. As such, it is contemplated that non-coherent Doppler spread estimations can be performed based on uplink CQI channel. To this end, it is noted that the energy of received symbols (data and pilot) is channel energy plus noise, whose variance increases as speed and/or noise variance increases. Yet, in a particular embodiment, an estimator design is provided which minimizes the effect of noise at the low operating SNR of CQI channels. Aspects of the subject innovation can then be based on theoretical analysis of the variance of received energy. Moreover, with appropriate normalization and correction according to SNR, the subject innovation can supply accurate estimations for various mobile speeds, SNR ranges, and channel models.

One of ordinary skill will appreciate several advantages of performing Doppler spread estimations according to the various aspects disclosed herein. For instance, the subject innovation eliminates the dependence on the number of pilots and improves the effective SNR (i.e., since both data and pilot symbols are employed). The disclosed aspects are also less complex to implement relative to conventional systems. One of ordinary skill will further appreciate that the disclosed aspects desirably provide adequate performance for both normal and extended CP, as well as different channel models. Moreover, the disclosed aspects can be readily extended to other channels (e.g., PUSCH, as long as QPSK modulation is used). Furthermore, the disclosed aspects can be readily extended to other modulations (e.g., PUSCH with 16 QAM or 64 QAM modulation) with variance of modulated symbol energy incorporated in noise variance normalization. The disclosed aspects are also desirably independent of a specific frame structure, which allow such aspects to be applied to systems other than LTE.

An exemplary algorithm for the subject innovation is now discussed. For this particular example, a simplified model of a low complexity non-coherent Doppler spread estimator is provided. In this model, given a snapshot of M symbols, it is assumed that the received signal at the i-th symbol is $r_i = h_i x_i + n_i$, where $i=1, \ldots M$ Here, it is further assumed that $x_i$, $h_i$, and $n_i$ are transmitted symbol, channel, and noise, respectively, wherein $n_i \sim N(0, \sigma^2)$, and wherein $x_i$ is QPSK modulated. The energy of the received signal can thus be expressed as $|r_i|^2 = |h_i|^2 + |n_i|^2 + h_i n_i^* + h_i^* n_i$, where $i=1, \ldots M$ For this particular example, $$E_S(y) = 1/M \sum_{i=1}^{M} y_i$$

can then be used to denote the short term average, whereas $$\mathrm{Var}(y) = 1/(M-1) \sum_{i=1}^{M} (y_i - E_s(y_i))^2$$

can be used to denote the short term variance. AWGN (additive white Gaussian noise) can then be expressed as $E_S(n_i) \cong 0$, $E_S(n_i^2) \cong \sigma^2$, and $E_S(n_i^3) \cong 0$, and $E_S(|n_i|^4) \cong 2\sigma^4$, which can be used to calculate a short term average of the received energy. Specifically, the short term average of the received energy over M symbols can be expressed as $\alpha = E_S(|r_i|^2) \cong E_S(|h|^2) + \sigma^2$ A short term variance can also be calculated. For instance, an exemplary derivation of the short term variance can be expressed as $$\begin{aligned}
\beta &= \mathrm{Var}(|r_i|^2) \\
&\cong \mathrm{Var}(|h_i|^2) + 2E_s(|h|^2 n^2) + \sigma^4 \\
&= \mathrm{Var}(|h_i|^2) + 2E_s(|h|^2 n^2) + \sigma^4 \\
&= \mathrm{Var}(|h_i|^2) + 2E_s(\Delta_h n^2) + 2E_s(|h|^2)\sigma^2 + \sigma^4 \\
&\cong \mathrm{Var}(|h_i|^2) + 2E_s(\Delta_h n^2) + 2\alpha\sigma^2 - \sigma^4
\end{aligned}$$

where $\Delta_{h_i} = |h_i|^2 - E_S(|h|^2)$

Long term average calculations for each of the short term average $\alpha$ and the short term variance $\beta$ are also contemplated. For instance, $E_1(\cdot)$ can be used to denote the long term average of multiple slots/antennas/subframes, wherein the long term averages of $\alpha$ and $\beta$ are $\bar{\alpha} = E_1(\alpha) = E_1[E_S(|h|^2)] + \sigma^2$ $\bar{\beta} = E_1(\beta) = E_1[\mathrm{Var}(|h_i|^2)] + 2E_1[E_S(\Delta_h n^2)] + 2\bar{\alpha}\sigma^2 - \sigma^4$ A ratio can then be expressed using each of $\alpha$ and $\beta$ as $$\frac{\bar{\beta}}{(\bar{\alpha} - \sigma^2)^2} = \frac{E_1[\mathrm{Var}(|h_i|^2)] + 2E_1[E_s(\Delta_h n^2)]}{(\bar{\alpha} - \sigma^2)^2} + \frac{2\bar{\alpha}\sigma^2 - \sigma^4}{(\bar{\alpha} - \sigma^2)^2}$$

Here, in case of zero speed, where $h_i = h$, $i = 1, \ldots, N$, the ratio becomes $$\frac{\bar{\beta}}{(\bar{\alpha} - \sigma^2)^2} = \frac{2\bar{\alpha}\sigma^2 - \sigma^4}{(\bar{\alpha} - \sigma^2)^2} = \frac{2\bar{\gamma} - 1}{(\bar{\gamma} - 1)^2}$$

where $\bar{\gamma} = \bar{\alpha}/\sigma^2$. Accordingly, at low speed, the ratio is only a function of geometry, which can be employed as a correction term. An exemplary metric for indicating speed could therefore be expressed as $$\varepsilon = \frac{\bar{\beta}}{(\bar{\alpha} - \sigma^2)^2} - \frac{2\bar{\alpha}\sigma^2 - \sigma^4}{(\bar{\alpha} - \sigma^2)^2}$$

Here, it should be noted that the metric approaches zero at lower speeds. Assuming at the receiver side, one already has a noise estimator to calculate short term noise variance $\sigma_S^2$, it may thus be desirable to perform the following exemplary computations: 1) Computation of received energy, 2) Computation of $\alpha$ and $\beta$, the short term mean and variance of received energy, 3) Computation of long term averages for each of $\alpha$ and $\beta$, 4) Computation of $\sigma^2$, the long term average of short term noise variance $\sigma_S^2$, and 5) Calculate Doppler estimate metric $\varepsilon$.

In an aspect, the disclosed algorithm may be applied on the uplink CQI channel. For instance, an exemplary receiver design for an uplink CQI channel includes user separation (sequence matching, IDFT (inverse discrete fourier transform), windowing and thresholding), channel estimation, noise and interference estimation, combining, demodulation, and decoding, wherein the disclosed algorithm can be directly coupled onto this receiver structure. Within such embodiment, the inputs are signals after user separation and noise variance estimation, which are collected over a period of time, whereas the output is the Doppler estimate metric.

Experimental results reveal that the disclosed aspects perform desirably in normal and extended CP at different speed for different channel models. It is observed that when SNR is above −5 dB, the Doppler estimate metrics of different channel models at the same speed are very close in values. Performance curves for SNR below −5 dB, however, are more unclear due to increased noise variance. At low and medium speed (e.g., 60 kph and 120 kph), the Doppler estimate metric is very close to 0 for all SNRs and channel models, showing that channel amplitude is almost invariant within one slot. As speed increases, the Doppler estimate metric also increases. To determine whether the speed is below or above a certain value (e.g, 120 kph), the metric can be compared with a predetermined threshold (e.g. 0.05). A coarse estimate between −10 and −5 dB and a more accurate estimate above −5 dB can be obtained.

Figure 4:
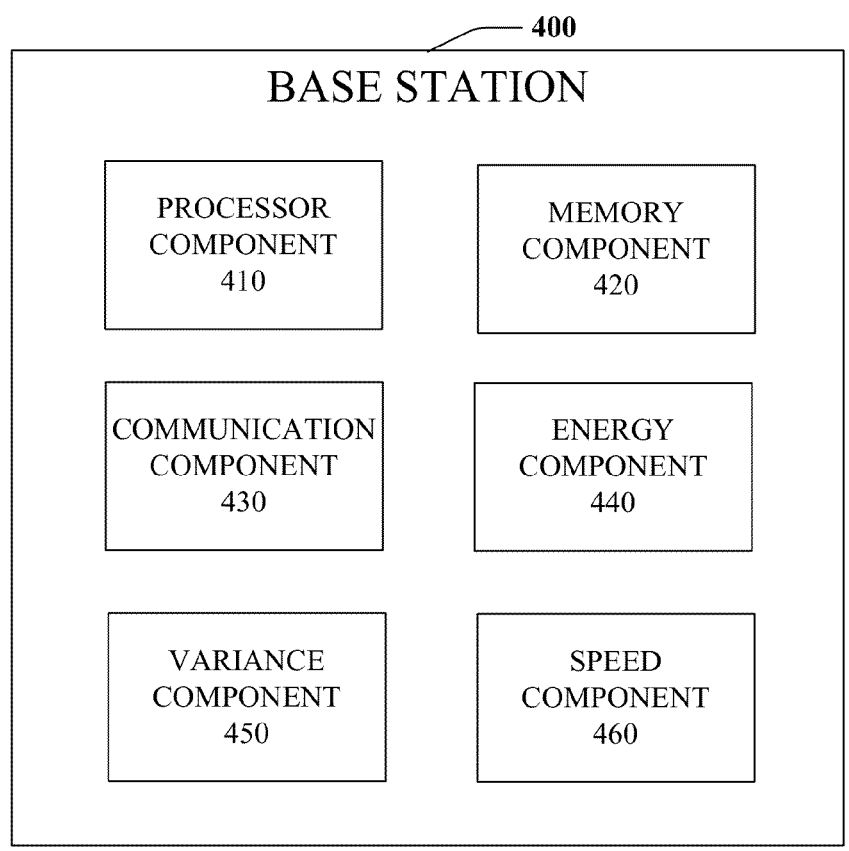
FIG. 4 illustrates a block diagram of an exemplary base station that facilitates performing a Doppler spread estimation in accordance with an aspect of the subject specification.

Referring next to FIG. 4, a block diagram of an exemplary base station (e.g., eNodeB) that facilitates performing a Doppler spread estimation according to an embodiment is provided. As shown, base station 400 may include processor component 410, memory component 420, communication component 430, energy component 440, variance component 450, and speed component 460.

In one aspect, processor component 410 is configured to execute computer-readable instructions related to performing any of a plurality of functions. Processor component 410 can be a single processor or a plurality of processors dedicated to analyzing information to be communicated from base station 400 and/or generating information that can be utilized by memory component 420, communication component 430, energy component 440, variance component 450, and/or speed component 460. Additionally or alternatively, processor component 410 may be configured to control one or more components of base station 400.

In another aspect, memory component 420 is coupled to processor component 410 and configured to store computer-readable instructions executed by processor component 410. Memory component 420 may also be configured to store any of a plurality of other types of data including generated by any of communication component 430, energy component 440, variance component 450, and/or speed component 460.

Memory component 420 can be configured in a number of different configurations, including as random access memory, battery-backed memory, hard disk, magnetic tape, etc. Various features can also be implemented upon memory component 420, such as compression and automatic back up (e.g., use of a Redundant Array of Independent Drives configuration).

In yet another aspect, base station 400 includes communication component 430, which is coupled to processor component 410 and configured to interface base station 400 with external entities. For instance, communication component 430 may be configured to receive a communication which includes at least two symbols from a wireless terminal. Here, it should be noted that the at least two symbols may, for example, include data symbols, pilot symbols, or any combination of appropriate symbols. In a particular aspect, it should be further noted that communication component 730 may be configured to receive the signal via an uplink channel having a constant modulus. Within such embodiment, the uplink channel can then be associated with any of a plurality of signal types including, for example, a Physical Uplink Shared Channel, a Physical Uplink Control Channel, and/or a Channel Quality Indicator.

As illustrated, base station 400 may also include energy component 440 and variance component 450. Within such embodiment, energy component 440 may be configured to ascertain an energy associated with the communication based on the at least two symbols, whereas variance component 450 may be configured to determine an energy variance and a noise variance.

In a further aspect, base station 400 includes speed component 460, as shown. Within such embodiment, speed component 460 may be configured to estimate a speed of the wireless terminal based on the energy variance and noise variance determined by variance component 450, wherein the energy variance is normalized by the noise variance. For instance, in a particular embodiment, speed component 460 is configured to calculate a metric based on the energy variance and the noise variance, wherein the speed of the wireless terminal is estimated by comparing the metric to a threshold.

Here, it should be noted that the metric calculated by speed component 460 may be ascertained by calculating any of a plurality of parameters. For example, in an aspect, speed component 460 is configured to calculate a long term average of a short term noise variance associated with the energy, wherein the metric is based on the long term average. In another aspect, speed component 460 is configured to calculate a short term average associated with the energy, wherein the metric is based on the short term average. Within such embodiment, speed component 460 may then be further configured to calculate a long term average of the short term average associated with the energy, wherein the metric is also based on the long term average. In yet another aspect, speed component 460 is configured to calculate a short term energy variance, wherein the metric is based on the short term energy variance. Speed component 460 may then be configured to calculate a long term average of the short term energy variance, wherein the metric is based on the long term average. Here, for some aspects, it should be noted that the metric may be directly proportional to the long term average of the short term energy variance.

Figure 5:
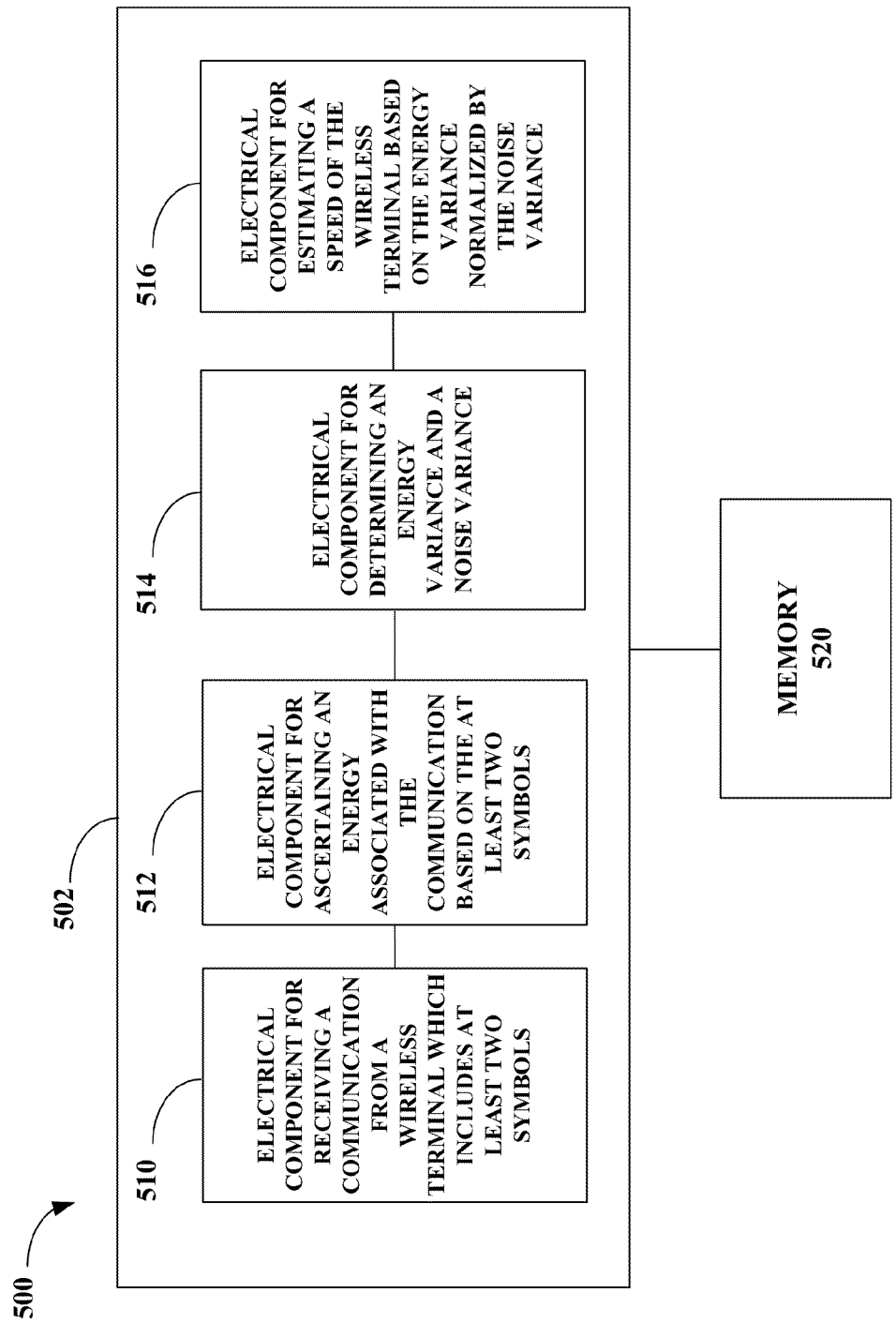
FIG. 5 is an illustration of an exemplary coupling of electrical components that effectuate performing a Doppler spread estimation according to an embodiment.

Turning to FIG. 5, illustrated is a system 500 that facilitates performing a Doppler spread estimation according to an embodiment. System 500 and/or instructions for implementing system 500 can reside within a network entity (e.g., base station 400) or a computer-readable storage medium, for instance. As depicted, system 500 includes functional blocks that can represent functions implemented by a processor, software, or combination thereof (e.g., firmware). System 500 includes a logical grouping 502 of electrical components that can act in conjunction. As illustrated, logical grouping 502 can include an electrical component for receiving a communication from a wireless terminal which includes at least at least two symbols 510, as well as an electrical component for ascertaining an energy associated with the communication based on the at least two symbols 512. Logical grouping 502 can also include an electrical component for determining an energy variance and a noise variance 514. Further, logical grouping 502 can include an electrical component for estimating a speed of the wireless terminal based on the energy variance normalized by the noise variance 516. Additionally, system 500 can include a memory 520 that retains instructions for executing functions associated with electrical components 510, 512, 514, and 516. While shown as being external to memory 520, it is to be understood that electrical components 510, 512, 514, and 516 can exist within memory 520.

Figure 6:
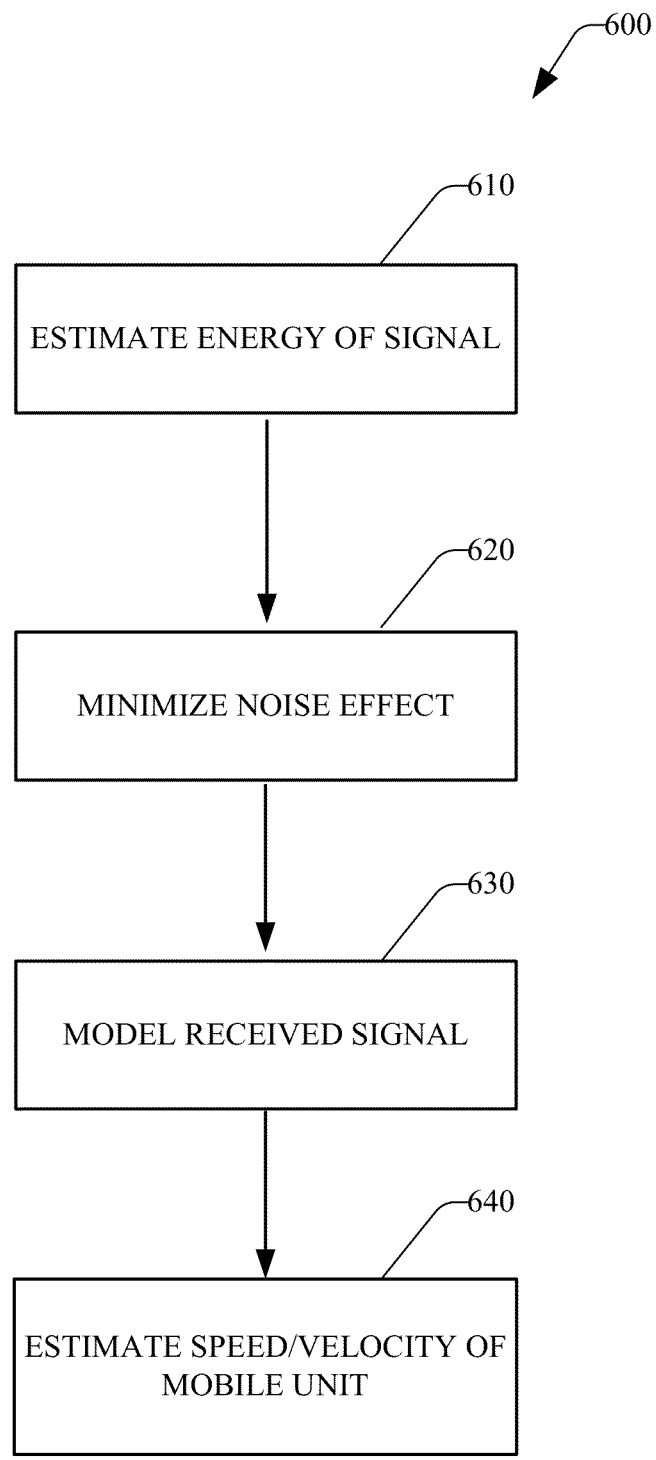
FIG. 6 is a flow chart illustrating an exemplary methodology for performing a Doppler spread estimation in accordance with an aspect of the subject specification.

Referring next to FIG. 6, a flow chart illustrating an exemplary method for performing a Doppler spread estimation is provided. As illustrated, process 600 includes a series of acts that may be performed by various components of a network entity (e.g., base station 400) according to an aspect of the subject specification. Process 600 may be implemented by employing at least one processor to execute computer executable instructions stored on a computer readable storage medium to implement the series of acts. In another embodiment, a computer-readable storage medium comprising code for causing at least one computer to implement the acts of process 600 are contemplated.

In an aspect, process 600 estimates the speed of a mobile unit by exploiting the constant modulo properties of the LTE UL channel. Initially, at act 610, process 600 estimates the energy of received symbols, wherein such energy includes channel energy and noise. Subsequently, the noise effect at the low operating SNR of CQI channels is minimized at act 620. Next, at act 630, the received signal is modeled with channel and noise variations. A substantially accurate speed estimate is then provided at act 640.

It is to be appreciated that apart from the above non-coherent Doppler spread estimation, decision feedback equalizer (DFE) based algorithm is also contemplated. Within such embodiment, after CQI decoding is completed, re-encoding and re-modulation is performed to remove the transmitted signal from the received signal. Namely, the transmitted signal is removed from the received signal to obtain a channel estimate from the data symbols. Subsequently, conventional channel estimate correlation algorithm can be employed to perform Doppler estimation. Here, it should be noted that, although this alternative can also be applied to PUSCH channel, such implementation may be more complex for some scenarios than the aforementioned non-coherent algorithm.

Figure 7:
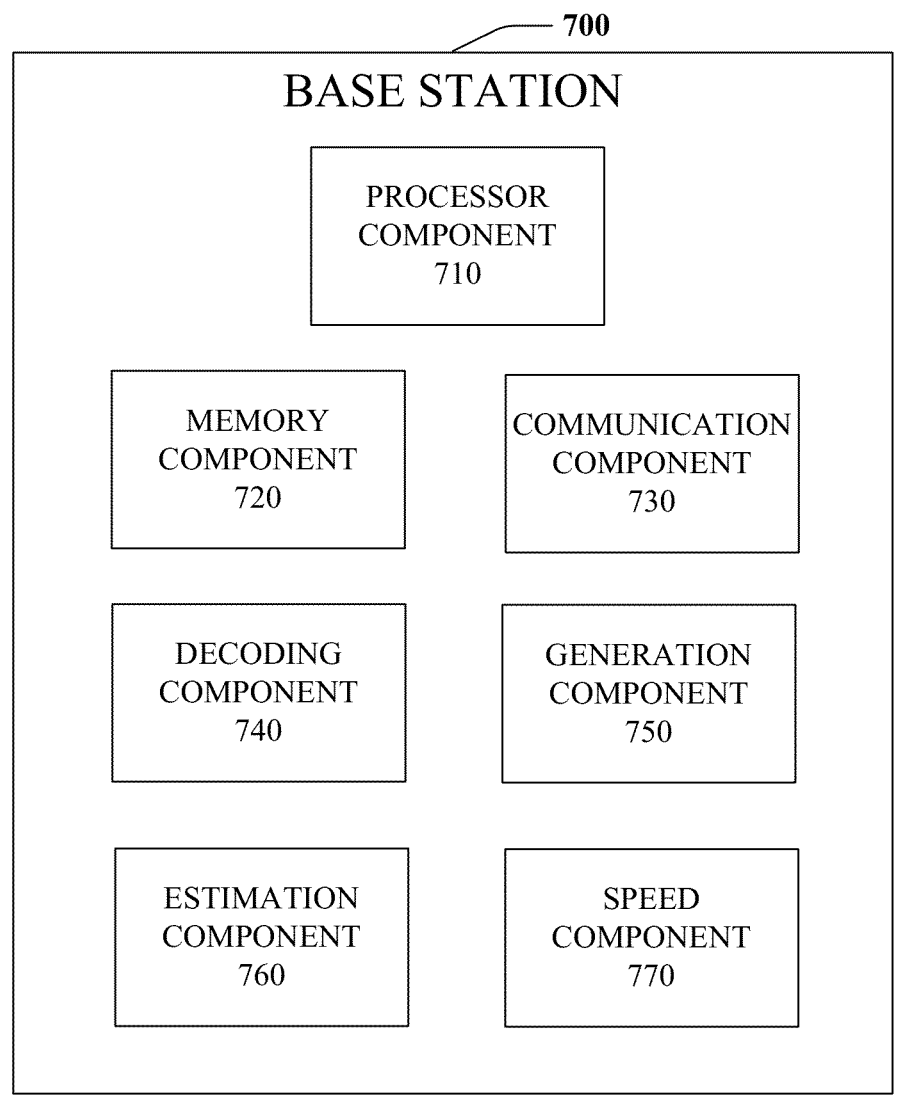
FIG. 7 illustrates a block diagram of an exemplary base station that facilitates performing a Doppler spread estimation in accordance with an alternative embodiment.

Referring next to FIG. 7, a block diagram illustrates an exemplary base station (e.g., eNodeB) that facilitates performing a Doppler spread estimation via a DFE-based algorithm in accordance with various aspects. As illustrated, base station 700 may include processor component 710, memory component 720, communication component 730, decoding component 740, generation component 750, estimation component 760, and speed component 770.

Similar to processor component 410 in base station 400, processor component 710 is configured to execute computer-readable instructions related to performing any of a plurality of functions. Processor component 710 can be a single processor or a plurality of processors dedicated to analyzing information to be communicated from base station 700 and/or generating information that can be utilized by memory component 720, communication component 730, decoding component 740, generation component 750, estimation component 760, and/or speed component 770. Additionally or alternatively, processor component 710 may be configured to control one or more components of base station 700.

In another aspect, memory component 720 is coupled to processor component 710 and configured to store computer-readable instructions executed by processor component 710. Memory component 720 may also be configured to store any of a plurality of other types of data including data generated by any of communication component 730, decoding component 740, generation component 750, estimation component 760, and/or speed component 770. Here, it should be noted that memory component 720 is analogous to memory component 420 in base station 400. Accordingly, it should be appreciated that any of the aforementioned features/configurations of memory component 420 are also applicable to memory component 720.

In yet another aspect, base station 700 includes communication component 730, which is coupled to processor component 710 and configured to interface base station 700 with external entities. For instance, communication component 730 may be configured to receive a signal which includes a set of pilot symbols and a set of data symbols from a wireless terminal. In a particular aspect, it should be noted that communication component 730 may be further configured to receive the signal via an uplink channel having a constant modulus. Within such embodiment, the uplink channel can then be associated with any of a plurality of signal types including, for example, a Physical Uplink Shared Channel, a Physical Uplink Control Channel, and/or a Channel Quality Indicator.

As illustrated, base station 700 may also include decoding component 740 and generation component 750. Within such embodiment, decoding component 740 is configured to decode the signal received via communication component 730, whereas generation component 750 is configured to generate a replica of the signal.

In a further aspect, base station 700 further includes estimation component 760 and speed component 770. Within such embodiment, estimation component 760 is configured to ascertain a channel estimate from the set of pilot symbols and a replicated set of data symbols included in the replica. Speed component 770 is then configured to estimate a speed of the wireless terminal based on the channel estimate.

Figure 8:
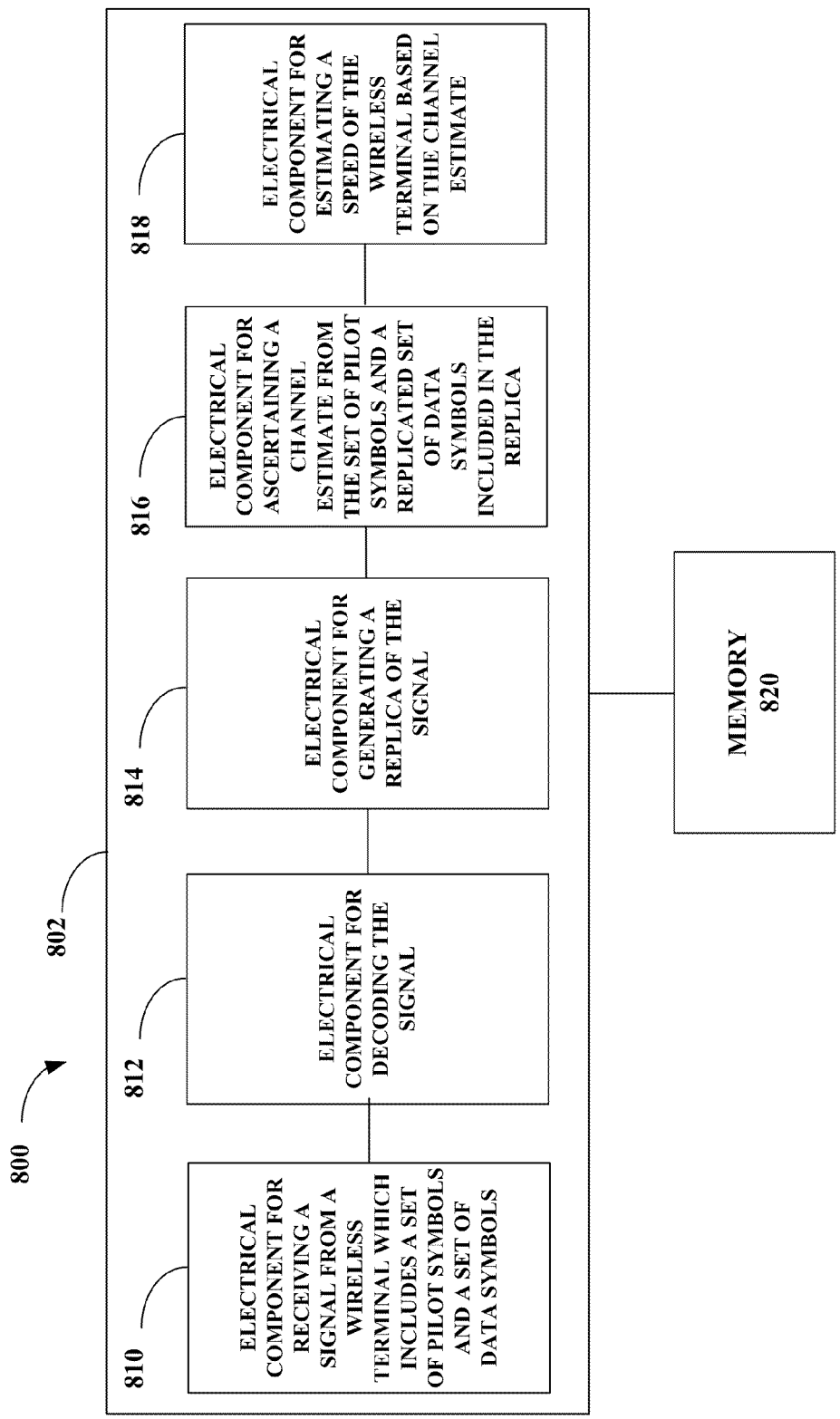
FIG. 8 is an illustration of an exemplary coupling of electrical components that effectuate performing a Doppler spread estimation according to an alternative embodiment.

Turning to FIG. 8, illustrated is a system 800 that facilitates performing a Doppler spread estimation according to an embodiment. System 800 and/or instructions for implementing system 800 can reside within a network entity (e.g., base station 700) or a computer-readable storage medium, for instance. As depicted, system 800 includes functional blocks that can represent functions implemented by a processor, software, or combination thereof (e.g., firmware). Moreover, system 800 includes a logical grouping 802 of electrical components that can act in conjunction similar to logical grouping 502 in system 500. As illustrated, logical grouping 802 can include an electrical component for receiving a signal from a wireless terminal which includes a set of pilot symbols and a set of data symbols 810, as well as an electrical component for decoding the signal 812. Logical grouping 802 can also include an electrical component for generating a replica of the signal 814. Further, logical grouping 802 can include an electrical component for ascertaining a channel estimate from the set of pilot symbols and a replicated set of data symbols included in the replica 816, as well as an electrical component for estimating a speed of the wireless terminal based on the channel estimate 818. Additionally, system 800 can include a memory 820 that retains instructions for executing functions associated with electrical components 810, 812, 814, 816, and 818. While shown as being external to memory 820, it is to be understood that electrical components 810, 812, 814, 816, and 818 can exist within memory 820.

Exemplary Communication System

Figure 9:
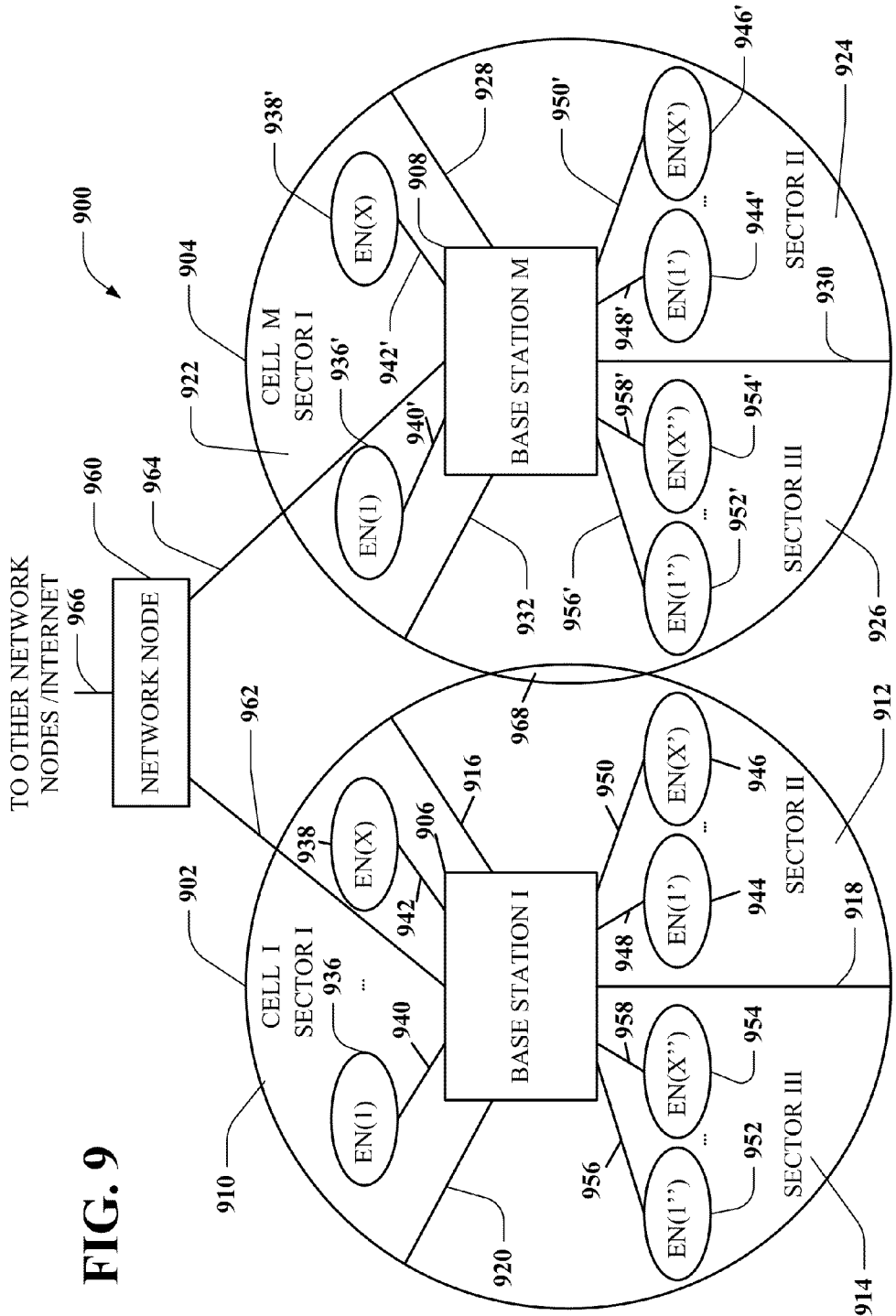
FIG. 9 is an illustration of an exemplary communication system implemented in accordance with various aspects including multiple cells.

Referring next to FIG. 9, an exemplary communication system 900 implemented in accordance with various aspects is provided including multiple cells: cell I 902, cell M 904. Here, it should be noted that neighboring cells 902, 904 overlap slightly, as indicated by cell boundary region 968, thereby creating potential for signal interference between signals transmitted by base stations in neighboring cells. Each cell 902, 904 of system 900 includes three sectors. Cells which have not been subdivided into multiple sectors (N=1), cells with two sectors (N=2) and cells with more than 3 sectors (N>3) are also possible in accordance with various aspects. Cell 902 includes a first sector, sector I 910, a second sector, sector II 912, and a third sector, sector III 914. Each sector 910, 912, and 914 has two sector boundary regions; each boundary region is shared between two adjacent sectors.

Sector boundary regions provide potential for signal interference between signals transmitted by base stations in neighboring sectors. Line 916 represents a sector boundary region between sector I 910 and sector II 912; line 918 represents a sector boundary region between sector II 912 and sector III 914; line 920 represents a sector boundary region between sector III 914 and sector I 910. Similarly, cell M 904 includes a first sector, sector I 922, a second sector, sector II 924, and a third sector, sector III 926. Line 928 represents a sector boundary region between sector I 922 and sector II 924; line 930 represents a sector boundary region between sector II 924 and sector III 926; line 932 represents a boundary region between sector III 926 and sector I 922. Cell I 902 includes a base station (BS), base station I 906, and a plurality of end nodes (ENs) in each sector 910, 912, 914. Sector I 910 includes EN(1) 936 and EN(X) 938 coupled to BS 906 via wireless links 940, 942, respectively; sector II 912 includes EN(1') 944 and EN(X') 946 coupled to BS 906 via wireless links 948, 950, respectively; sector III 914 includes EN(1") 952 and EN(X") 954 coupled to BS 906 via wireless links 956, 958, respectively. Similarly, cell M 904 includes base station M 908, and a plurality of end nodes (ENs) in each sector 922, 924, and 926. Sector I 922 includes EN(1) 936' and EN(X) 938' coupled to BS M 908 via wireless links 940', 942', respectively; sector II 924 includes EN(1') 944' and EN(X') 946' coupled to BS M 908 via wireless links 948', 950', respectively; sector III 926 includes EN(1") 952' and EN(X") 954' coupled to BS 908 via wireless links 956', 958', respectively.

System 900 also includes a network node 960 which is coupled to BS I 906 and BS M 908 via network links 962, 964, respectively. Network node 960 is also coupled to other network nodes, e.g., other base stations, AAA server nodes, intermediate nodes, routers, etc. and the Internet via network link 966. Network links 962, 964, 966 may be, e.g., fiber optic cables. Each end node, e.g. EN 1 936 may be a wireless terminal including a transmitter as well as a receiver. The wireless terminals, e.g., EN(1) 936 may move through system 900 and may communicate via wireless links with the base station in the cell in which the EN is currently located. The wireless terminals, (WTs), e.g. EN(1) 936, may communicate with peer nodes, e.g., other WTs in system 900 or outside system 900 via a base station, e.g. BS 906, and/or network node 960. WTs, e.g., EN(1) 936 may be mobile communications devices such as cell phones, personal data assistants with wireless modems, etc. Respective base stations perform tone subset allocation using a different method for the strip-symbol periods, from the method employed for allocating tones and determining tone hopping in the rest symbol periods, e.g., non strip-symbol periods. The wireless terminals use the tone subset allocation method along with information received from the base station, e.g., base station slope ID, sector ID information, to determine tones that they can employ to receive data and information at specific strip-symbol periods. The tone subset allocation sequence is constructed, in accordance with various aspects to spread inter-sector and inter-cell interference across respective tones. Although the subject system was described primarily within the context of cellular mode, it is to be appreciated that a plurality of modes may be available and employable in accordance with aspects described herein.

Exemplary Base Station

Figure 10:
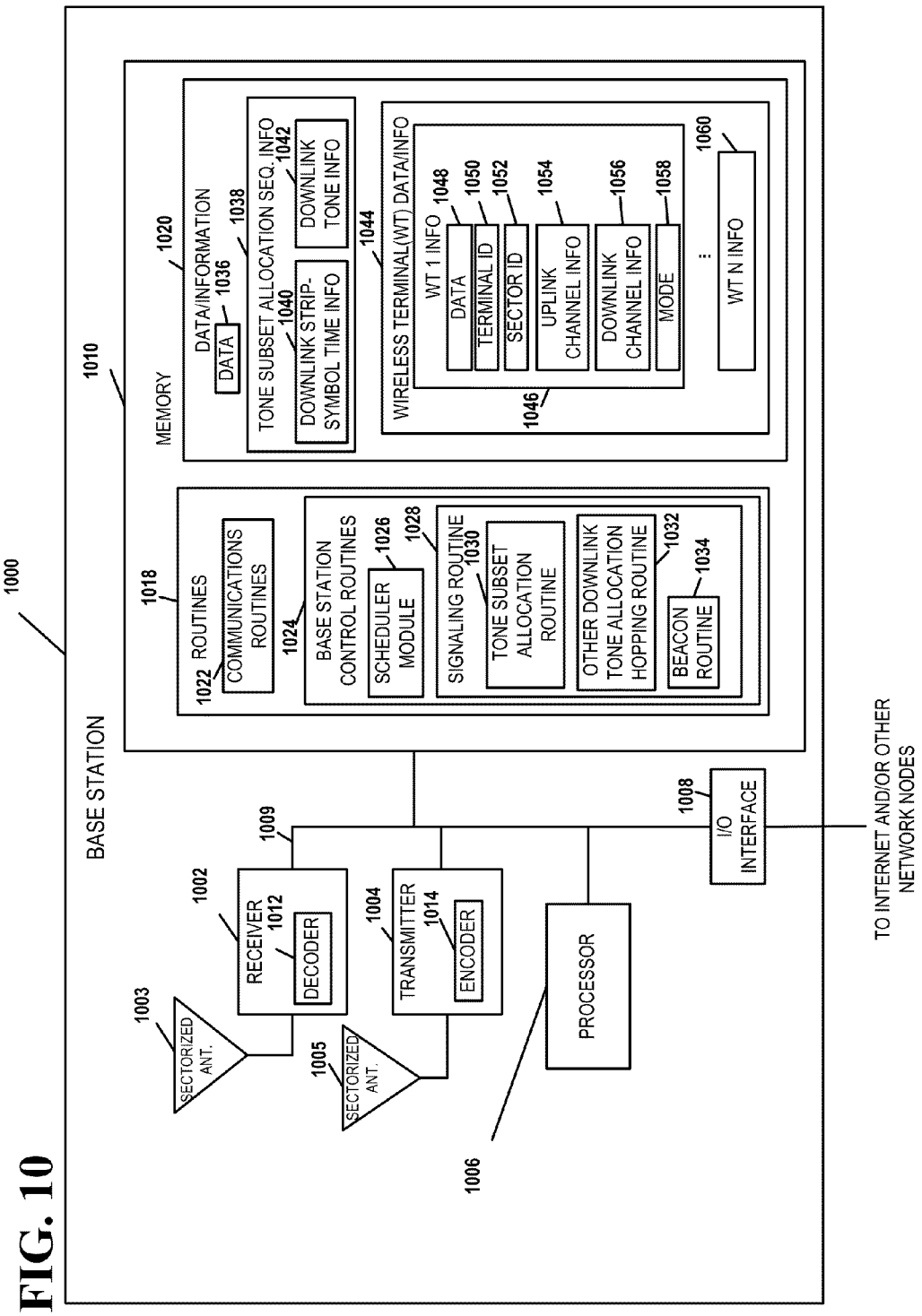
FIG. 10 is an illustration of an exemplary base station in accordance with various aspects described herein.

FIG. 10 illustrates an example base station 1000 in accordance with various aspects. Base station 1000 implements tone subset allocation sequences, with different tone subset allocation sequences generated for respective different sector types of the cell. Base station 1000 may be used as any one of base stations 906, 908 of the system 900 of FIG. 9. The base station 1000 includes a receiver 1002, a transmitter 1004, a processor 1006, e.g., CPU, an input/output interface 1008 and memory 1010 coupled together by a bus 1009 over which various elements 1002, 1004, 1006, 1008, and 1010 may interchange data and information.

Sectorized antenna 1003 coupled to receiver 1002 is used for receiving data and other signals, e.g., channel reports, from wireless terminals transmissions from each sector within the base station's cell. Sectorized antenna 1005 coupled to transmitter 1004 is used for transmitting data and other signals, e.g., control signals, pilot signal, beacon signals, etc. to wireless terminals 1100 (see FIG. 11) within each sector of the base station's cell. In various aspects, base station 1000 may employ multiple receivers 1002 and multiple transmitters 1004, e.g., an individual receivers 1002 for each sector and an individual transmitter 1004 for each sector. Processor 1006, may be, e.g., a general purpose central processing unit (CPU). Processor 1006 controls operation of base station 1000 under direction of one or more routines 1018 stored in memory 1010 and implements the methods. I/O interface 1008 provides a connection to other network nodes, coupling the BS 1000 to other base stations, access routers, AAA server nodes, etc., other networks, and the Internet. Memory 1010 includes routines 1018 and data/information 1020.

Data/information 1020 includes data 1036, tone subset allocation sequence information 1038 including downlink strip-symbol time information 1040 and downlink tone information 1042, and wireless terminal (WT) data/info 1044 including a plurality of sets of WT information: WT 1 info 1046 and WT N info 1060. Each set of WT info, e.g., WT 1 info 1046 includes data 1048, terminal ID 1050, sector ID 1052, uplink channel information 1054, downlink channel information 1056, and mode information 1058.

Routines 1018 include communications routines 1022 and base station control routines 1024. Base station control routines 1024 includes a scheduler module 1026 and signaling routines 1028 including a tone subset allocation routine 1030 for strip-symbol periods, other downlink tone allocation hopping routine 1032 for the rest of symbol periods, e.g., non strip-symbol periods, and a beacon routine 1034.

Data 1036 includes data to be transmitted that will be sent to encoder 1014 of transmitter 1004 for encoding prior to transmission to WTs, and received data from WTs that has been processed through decoder 1012 of receiver 1002 following reception. Downlink strip-symbol time information 1040 includes the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone information 1042 includes information including a carrier frequency assigned to the base station 1000, the number and frequency of tones, and the set of tone subsets to be allocated to the strip-symbol periods, and other cell and sector specific values such as slope, slope index and sector type.

Data 1048 may include data that WT1 1100 has received from a peer node, data that WT 1 1100 desires to be transmitted to a peer node, and downlink channel quality report feedback information. Terminal ID 1050 is a base station 1000 assigned ID that identifies WT 1 1100. Sector ID 1052 includes information identifying the sector in which WT1 1100 is operating. Sector ID 1052 can be used, for example, to determine the sector type. Uplink channel information 1054 includes information identifying channel segments that have been allocated by scheduler 1026 for WT1 1100 to use, e.g., uplink traffic channel segments for data, dedicated uplink control channels for requests, power control, timing control, etc. Each uplink channel assigned to WT1 1100 includes one or more logical tones, each logical tone following an uplink hopping sequence. Downlink channel information 1056 includes information identifying channel segments that have been allocated by scheduler 1026 to carry data and/or information to WT1 1100, e.g., downlink traffic channel segments for user data. Each downlink channel assigned to WT1 1100 includes one or more logical tones, each following a downlink hopping sequence. Mode information 1058 includes information identifying the state of operation of WT1 1100, e.g. sleep, hold, on.

Communications routines 1022 control the base station 1000 to perform various communications operations and implement various communications protocols. Base station control routines 1024 are used to control the base station 1000 to perform basic base station functional tasks, e.g., signal generation and reception, scheduling, and to implement the steps of the method of some aspects including transmitting signals to wireless terminals using the tone subset allocation sequences during the strip-symbol periods.

Signaling routine 1028 controls the operation of receiver 1002 with its decoder 1012 and transmitter 1004 with its encoder 1014. The signaling routine 1028 is responsible controlling the generation of transmitted data 1036 and control information. Tone subset allocation routine 1030 constructs the tone subset to be used in a strip-symbol period using the method of the aspect and using data/info 1020 including downlink strip-symbol time info 1040 and sector ID 1052. The downlink tone subset allocation sequences will be different for each sector type in a cell and different for adjacent cells. The WTs 1100 receive the signals in the strip-symbol periods in accordance with the downlink tone subset allocation sequences; the base station 1000 uses the same downlink tone subset allocation sequences in order to generate the transmitted signals. Other downlink tone allocation hopping routine 1032 constructs downlink tone hopping sequences, using information including downlink tone information 1042, and downlink channel information 1056, for the symbol periods other than the strip-symbol periods. The downlink data tone hopping sequences are synchronized across the sectors of a cell. Beacon routine 1034 controls the transmission of a beacon signal, e.g., a signal of relatively high power signal concentrated on one or a few tones, which may be used for synchronization purposes, e.g., to synchronize the frame timing structure of the downlink signal and therefore the tone subset allocation sequence with respect to an ultra-slot boundary.

Exemplary Wireless Terminal

Figure 11:
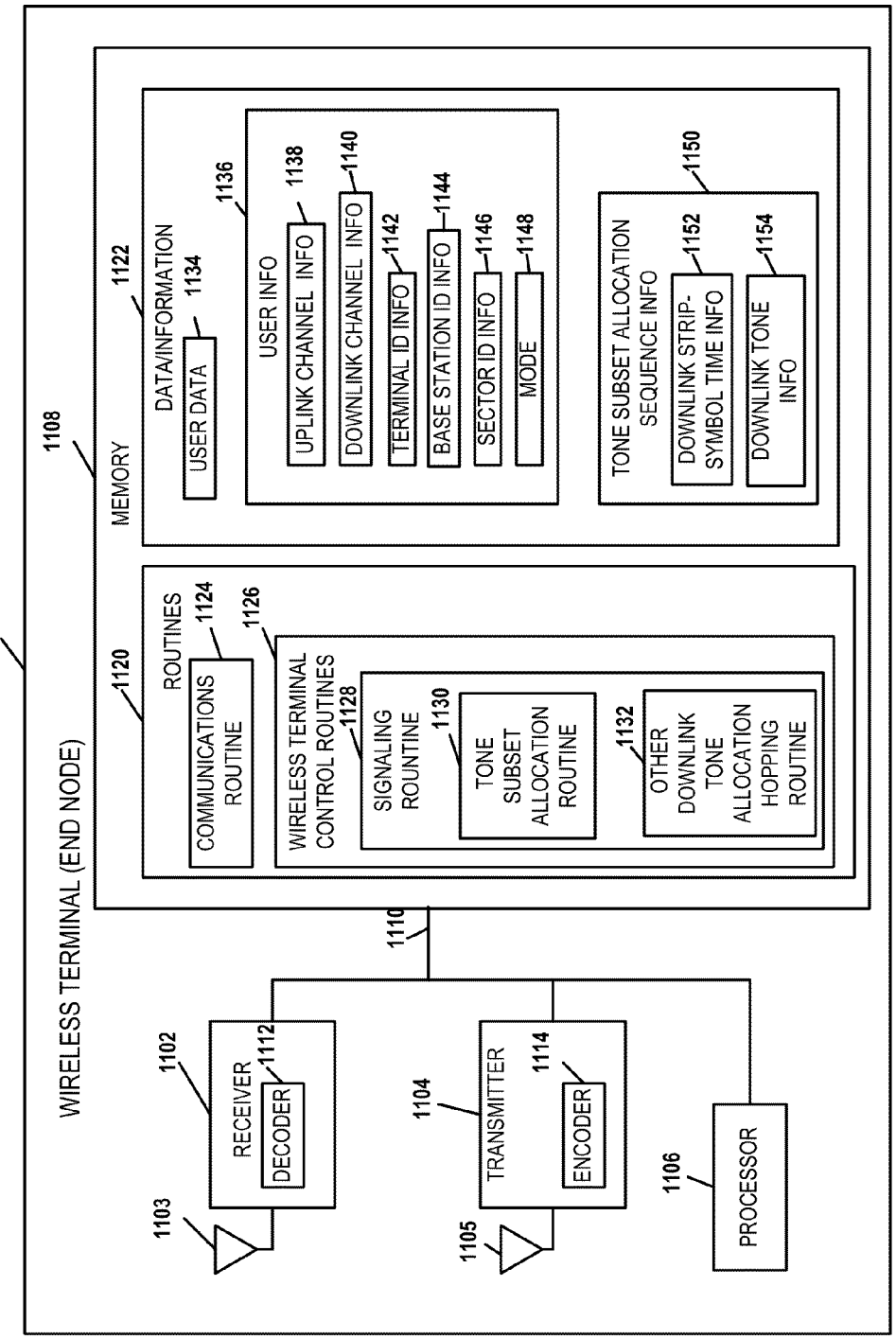
FIG. 11 is an illustration of an exemplary wireless terminal implemented in accordance with various aspects described herein.

FIG. 11 illustrates an example wireless terminal (end node) 1100 which can be used as any one of the wireless terminals (end nodes), e.g., EN(1) 936, of the system 900 shown in FIG. 9. Wireless terminal 1100 implements the tone subset allocation sequences. The wireless terminal 1100 includes a receiver 1102 including a decoder 1112, a transmitter 1104 including an encoder 1114, a processor 1106, and memory 1108 which are coupled together by a bus 1110 over which the various elements 1102, 1104, 1106, 1108 can interchange data and information. An antenna 1103 used for receiving signals from a base station (and/or a disparate wireless terminal) is coupled to receiver 1102. An antenna 1105 used for transmitting signals, e.g., to a base station (and/or a disparate wireless terminal) is coupled to transmitter 1104.

The processor 1106, e.g., a CPU controls the operation of the wireless terminal 1100 and implements methods by executing routines 1120 and using data/information 1122 in memory 1108.

Data/information 1122 includes user data 1134, user information 1136, and tone subset allocation sequence information 1150. User data 1134 may include data, intended for a peer node, which will be routed to encoder 1114 for encoding prior to transmission by transmitter 1104 to a base station, and data received from the base station which has been processed by the decoder 1112 in receiver 1102. User information 1136 includes uplink channel information 1138, downlink channel information 1140, terminal ID information 1142, base station ID information 1144, sector ID information 1146, and mode information 1148. Uplink channel information 1138 includes information identifying uplink channels segments that have been assigned by a base station for wireless terminal 1100 to use when transmitting to the base station. Uplink channels may include uplink traffic channels, dedicated uplink control channels, e.g., request channels, power control channels and timing control channels. Each uplink channel includes one or more logic tones, each logical tone following an uplink tone hopping sequence. The uplink hopping sequences are different between each sector type of a cell and between adjacent cells. Downlink channel information 1140 includes information identifying downlink channel segments that have been assigned by a base station to WT 1100 for use when the base station is transmitting data/information to WT 1100. Downlink channels may include downlink traffic channels and assignment channels, each downlink channel including one or more logical tone, each logical tone following a downlink hopping sequence, which is synchronized between each sector of the cell.

User info 1136 also includes terminal ID information 1142, which is a base station-assigned identification, base station ID information 1144 which identifies the specific base station that WT has established communications with, and sector ID info 1146 which identifies the specific sector of the cell where WT 1100 is presently located. Base station ID 1144 provides a cell slope value and sector ID info 1146 provides a sector index type; the cell slope value and sector index type may be used to derive tone hopping sequences. Mode information 1148 also included in user info 1136 identifies whether the WT 1100 is in sleep mode, hold mode, or on mode.

Tone subset allocation sequence information 1150 includes downlink strip-symbol time information 1152 and downlink strip-symbol tone information 1154. Downlink strip-symbol time information 1152 include the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone info 1154 includes information including a carrier frequency assigned to the base station, the number and frequency of tones, and the set of tone subsets to be allocated to the strip-symbol periods, and other cell and sector specific values such as slope, slope index and sector type.

Routines 1120 include communications routines 1124 and wireless terminal control routines 1126. Communications routines 1124 control the various communications protocols used by WT 1100. Wireless terminal control routines 1126 controls basic wireless terminal 1100 functionality including the control of the receiver 1102 and transmitter 1104. Wireless terminal control routines 1126 include the signaling routine 1128. The signaling routine 1128 includes a tone subset allocation routine 1130 for the strip-symbol periods and an other downlink tone allocation hopping routine 1132 for the rest of symbol periods, e.g., non strip-symbol periods. Tone subset allocation routine 1130 uses user data/info 1122 including downlink channel information 1140, base station ID info 1144, e.g., slope index and sector type, and downlink tone information 1154 in order to generate the downlink tone subset allocation sequences in accordance with some aspects and process received data transmitted from the base station. Other downlink tone allocation hopping routine 1132 constructs downlink tone hopping sequences, using information including downlink tone information 1154, and downlink channel information 1140, for the symbol periods other than the strip-symbol periods. Tone subset allocation routine 1130, when executed by processor 1106, is used to determine when and on which tones the wireless terminal 1100 is to receive one or more strip-symbol signals from the base station 1000. The uplink tone allocation hopping routine 1132 uses a tone subset allocation function, along with information received from the base station, to determine the tones in which it should transmit on.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

When the embodiments are implemented in program code or code segments, it should be appreciated that a code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc. Additionally, in some aspects, the steps and/or actions of a method or algorithm can reside as one or any combination or set of codes and/or instructions on a machine readable medium and/or computer readable medium, which can be incorporated into a computer program product.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, as used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

What is claimed is:

1. A method that facilitates performing a Doppler spread estimation, the method comprising:
    receiving a communication from a wireless terminal, wherein the communication includes at least two symbols;
    ascertaining an energy associated with the communication, wherein the energy is based on the at least two symbols;
    determining an energy variance and a noise variance; and
    estimating a speed of the wireless terminal based on the energy variance normalized by the noise variance.

2. The method of claim 1, wherein the communication is received via an uplink channel having a constant modulus.

3. The method of claim 2, wherein the uplink channel is associated with a Physical Uplink Control Channel.

4. The method of claim 3, wherein the uplink channel is associated with a Channel Quality Indicator.

5. The method of claim 2, wherein the uplink channel is associated with a Physical Uplink Shared Channel.

6. The method of claim 1, further comprising calculating a metric based on the energy variance and the noise variance, wherein the estimating includes comparing the metric to a threshold.

7. The method of claim 6, wherein the calculating comprises calculating a short term average associated with the energy, and wherein the metric is based on the short term average.

8. The method of claim 7, wherein the calculating comprises calculating a long term average of the short term average associated with the energy, and wherein the metric is based on the long term average.

9. The method of claim 6, wherein the calculating comprises calculating a short term energy variance, and wherein the metric is based on the short term energy variance.

10. The method of claim 9, wherein the calculating comprises calculating a long term average of the short term energy variance, and wherein the metric is based on the long term average.

11. The method of claim 10, wherein the metric is directly proportional to the long term average of the short term energy variance.

12. The method of claim 6, wherein the calculating comprises calculating a long term average of a short term noise variance associated with the energy, and wherein the metric is based on the long term average.

13. The method of claim 1, wherein the at least two symbols comprise any combination of data symbols or pilot symbols.

14. An apparatus configured to facilitate performing a Doppler spread estimation, the apparatus comprising:
    a processor configured to execute computer executable components stored in memory, the components including:
    a communication component configured to receive a communication from a wireless terminal, wherein the communication includes at least two symbols;
    an energy component configured to ascertain an energy associated with the communication, wherein the energy is based on the at least two symbols;
    a variance component configured to determine an energy variance and a noise variance; and
    a speed component configured to estimate a speed of the wireless terminal based on the energy variance normalized by the noise variance.

15. The apparatus of claim 14, wherein the communication component is configured to receive the communication via an uplink channel having a constant modulus.

16. The apparatus of claim 15, wherein the uplink channel is associated with a Physical Uplink Control Channel.

17. The apparatus of claim 16, wherein the uplink channel is associated with a Channel Quality Indicator.

18. The apparatus of claim 15, wherein the uplink channel is associated with a Physical Uplink Shared Channel.

19. The apparatus of claim 14, wherein the speed component is configured to calculate a metric based on the energy variance and the noise variance, and wherein the speed component is further configured to estimate the speed by comparing the metric to a threshold.

20. The apparatus of claim 19, wherein the speed component is configured to calculate a short term average associated with the energy, and wherein the metric is based on the short term average.

21. The apparatus of claim 20, wherein the speed component is configured to calculate a long term average of the short term average associated with the energy, and wherein the metric is based on the long term average.

22. The apparatus of claim 19, wherein the speed component is configured to calculate a short term energy variance, and wherein the metric is based on the short term energy variance.

23. The apparatus of claim 22, wherein the speed component is configured to calculate a long term average of the short term energy variance, and wherein the metric is based on the long term average.

24. The apparatus of claim 23, wherein the metric is directly proportional to the long term average of the short term energy variance.

25. The apparatus of claim 19, wherein the speed component is configured to calculate a long term average of a short term noise variance associated with the energy, and wherein the metric is based on the long term average.

26. The apparatus of claim 14, wherein the at least two symbols comprise any combination of data symbols or pilot symbols.

27. A computer program product that facilitates performing a Doppler spread estimation, comprising:
    a computer-readable storage medium comprising code for causing at least one computer to:

receive a communication from a wireless terminal, wherein the communication includes at least two symbols;

ascertain an energy associated with the communication, wherein the energy is based on the at least two symbols;

determine an energy variance and a noise variance; and estimate a speed of the wireless terminal based on the energy variance normalized by the noise variance.

28. The computer program product of claim 25, the code further causing the at least one computer to calculate a metric based on the energy variance and the noise variance, wherein the speed is estimated by comparing the metric to a threshold.

29. The computer program product of claim 26, the code further causing the at least one computer to calculate a short term average associated with the energy, wherein the metric is based on the short term average.

30. The computer program product of claim 27, the code further causing the at least one computer to calculate a long term average of the short term average associated with the energy, wherein the metric is based on the long term average.

31. The computer program product of claim 26, the code further causing the at least one computer to calculate a short term energy variance, wherein the metric is based on the short term energy variance.

32. The computer program product of claim 29, the code further causing the at least one computer to calculate a long term average of the short term energy variance, wherein the metric is based on the long term average.

33. The computer program product of claim 30, wherein the metric is directly proportional to the long term average of the short term energy variance.

34. The computer program product of claim 26, the code further causing the at least one computer to calculate a long term average of a short term noise variance associated with the energy, wherein the metric is based on the long term average.

35. The computer program product of claim 27, wherein the at least two symbols comprise any combination of data symbols or pilot symbols.

36. An apparatus configured to facilitate performing a Doppler spread estimation, the apparatus comprising:

means for receiving a communication from a wireless terminal, wherein the communication includes at least two symbols;

means for ascertaining an energy associated with the communication, wherein the energy is based on the at least two symbols;

means for determining an energy variance and a noise variance; and means for estimating a speed of the wireless terminal based on the energy variance normalized by the noise variance.

37. The apparatus of claim 33, wherein the means for receiving is configured to receive the communication via an uplink channel having a constant modulus.

38. The apparatus of claim 34, wherein the uplink channel is associated with a Physical Uplink Control Channel.

39. The apparatus of claim 35, wherein the uplink channel is associated with a Channel Quality Indicator.

40. The apparatus of claim 34, wherein the uplink channel is associated with a Physical Uplink Shared Channel.

41. The apparatus of claim 36, wherein the at least two symbols comprise any combination of data symbols or pilot symbols.

* * * * *